United States Patent [19]
Morris

[11] 4,309,735
[45] Jan. 5, 1982

[54] PROTECTIVE CIRCUITS FOR CONVERTER-SUPPLIED D.C. MOTOR

[75] Inventor: Gary C. Morris, Milwaukee, Wis.

[73] Assignee: Harnischfeger Corporation, West Milwaukee, Wis.

[21] Appl. No.: 89,301

[22] Filed: Oct. 30, 1979

[51] Int. Cl.³ ............................................. H02H 7/085
[52] U.S. Cl. ..................................... 361/100; 361/31; 361/57; 363/58; 318/762; 318/434
[58] Field of Search ..................... 361/100, 23, 31, 57; 363/57, 58, 55, 56, 50, 51, 54; 318/434, 803, 760, 762, 414, 416, 500, 501, 507, 144, 158, 302, 332, 341, 342, 345 R; 307/252 M

[56] References Cited

U.S. PATENT DOCUMENTS

| | | | |
|---|---|---|---|
| 3,133,209 | 5/1964 | Greenwood et al. | 307/252 M |
| 3,536,984 | 10/1970 | Rosenberry | 363/58 |
| 3,584,282 | 6/1971 | Reeves et al. | 318/332 |
| 3,590,350 | 6/1971 | Munson | 318/144 |
| 3,725,742 | 4/1973 | Pollard | 361/100 |
| 3,968,420 | 7/1976 | Yoshida | 307/252 M X |
| 4,039,914 | 8/1977 | Steigerwald et al. | 318/762 X |
| 4,074,175 | 2/1978 | Born et al. | 318/434 X |
| 4,150,325 | 4/1979 | Miller et al. | 318/434 |
| 4,151,450 | 4/1979 | Fukuma et al. | 318/434 X |

*Primary Examiner*—Patrick R. Salce
*Attorney, Agent, or Firm*—James E. Nilles

[57] ABSTRACT

A d.c. motor whose armature is supplied from an a.c. power source through an a.c./d.c. thyristor converter and is subject to damaging commutator flash-over, as from loss of a.c. voltage during regeneration is provided with a protective circuit which includes a normally charged capacitor and a diverter resistor which are connectable across the converter and motor armature, respectively, by SCR means in response to a fault condition such as either predetermined high output current from the converter (i.e., indicative of high armature current) or excess a.c. input current to the converter. Connection of the capacitor across the converter and its discharge instantaneously and forcibly but temporarily blocks current flow from the converter thyristors to the motor armature. Connection of the diverter resistor across the motor armature absorbs energy generated thereby and reduces armature current to prevent commutator flash-over while other controls responsive to the fault condition permanently switch off the converter thyristors and set a brake to stop armature rotation.

1 Claim, 11 Drawing Figures

MOTOR ARMATURE CURRENT DURING DIVERTER CIRCUIT OPERATION

CAPACITOR VOLTAGE DURING DIVERTER CIRCUIT OPERATION

DIVERTER RESISTOR CURRENT DURING DIVERTER CIRCUIT OPERATION

PROTECTIVE CIRCUITS FOR CONVERTER-SUPPLIED D.C. MOTOR

BACKGROUND OF THE INVENTION

1. Field of Use

This invention relates generally to protective circuits for d.c. motors having armatures which are supplied with power from a.c./d.c. thyristor converters. In particular, it relates to protective circuits which are responsive to over-current faults to interrupt d.c. current flow from the converter to the motor armature and divert current flow generated by the motor armature until armature rotation can be stopped and the converter disconnected.

2. Description of the Prior Art

Heavy equipment or heavy machinery, such as large electric mining shovels or the like, employ extremely large electric motors (in the range of 100 horsepower on up) to drive machine components and impart hoist, swing and other motions thereto. Very often, these are d.c. motors whose armatures are supplied with d.c. power from three-phase a.c. power sources by means of a.c./d.c. thyristor converters with employ SCR's, thyratrons, or similarly functioning triggerable rectifier-type devices.

As a practical matter, any fault condition which gives rise to a short circuit across the motor armature causes armature current to increase rapidly and greatly, limited only by the resistance and inductance of the armature. As a result, flash-over or arcing occurs between the motor brushes and motor commutator which, if not extinguished quickly, causes a damaging ring to be burned into the commutator which is time-consuming and costly to repair.

Heretofore, it was the practice to employ protective devices, such a fast-acting mechanical d.c. circuit breakers, contactors or switches in the armature loop of large converter-supplied d.c. motors. These devices were responsive to a fault condition to interrupt current flow and extinguish the arc. But this prior art solution has three major drawbacks. The first major drawback is that such other devices are too slow to limit current and prevent motor flash-over. Second, since such protective devices need to be very large physically in order to quickly and effectively extinguish the arc, they are unsuitable for mounting on mobile equipment such as electric mining shovels. Third, since such protective devices are electromechanical in nature and subject to heavy physical shocks and vibrations during operation of a mining shovel, or other mobile equipment, they are unreliable in that they can operate accidently and cause nuisance shut-downs of the equipment.

U.S. Pat. No. 4,150,325 filed Dec. 2, 1977 and issued April 17, 1979 discloses forced firing of certain thyristors in a motor control system to achieve corrective action.

U.S. Pat. No. 3,584,282 filed April 1, 1969 and issued June 8, 1971 discloses use of a current limiting resistor in a motor armature circuit but employs a capacitor to modify or control thyristor firing time.

U.S. Pat. No. 4,074,175 filed April 15, 1976 and issued Feb. 14, 1978 shows an inductive load current measuring.

U.S. Pat. No. 4,151,450 filed July 28, 1977 and issued April 24, 1979 shows a circuit for protecting a d.c. motor against excessive current.

U.S. Pat. No. 3,590,350 filed Aug. 30, 1968 and issued June 29, 1971 shows a motor control for a hoist drive.

SUMMARY OF THE INVENTION

The present invention provides improved means in the form of protective circuits for protecting the armature of an a.c./d.c. thyristor type converter-supplied d.c. motor against flashover resulting from excessively high current in the armature caused by fault conditions in the power supply or by low voltage or loss of voltage during regeneration. The present invention is especially well-adapted for, but is not limited to, use with extremely large d.c. motors such as are used on large heavy mobile equipment, such as electric mining shovels, cranes or the like.

Each of the several protective circuits disclosed herein include a normally charged capacitor and a diverter resistor which are connectable across the converter and armature, respectively, by control means such as an SCR in response to a fault condition appearing as high output current from the converter (i.e., high armature current) or excessive a.c. input current to the converter. Connection and discharge of the capacitor across the converter instantaneously and forcibly but temporarily blocks current flow from the converter thyristors to the motor armature and connection of the diverter resistor across the armature diverts and absorbs energy generated thereby and reduces armature current to prevent flash-over, while other controls associated with the protective circuit respond to the fault condition to initiate a shut-down sequence which includes permanently switching off the converter thyristors and stopping armature rotation as by means of setting brakes.

The protective circuits in accordance with the present invention provide numerous advantages over the prior art. For example, each of the protective circuits provide nearly instantaneous shut-down of the converter after a d.c. current fault has been detected. Thus, possible additional component damage to SCR's, fuses and motors is minimized since fault currents are reduced to acceptable levels within a few milliseconds. Furthermore, the protective circuits, coupled with suitable a.c. circuit fault protection, make possible completely fuseless motor control systems.

The converter bridge current output is monitored continuously and should it ever exceed a predetermined level, the protective circuits initiate the shut-down sequence.

However, the protective circuits can be used on any converter system, including reversing drives, with suitable modification. The protective circuits function if an excessive d.c. current is detected, or an a.c. line-to-line fault occurs, to thereby reduce possible failure in the thyristor bridge components.

Other objects and advantages of the present invention will hereinafter appear.

DESCRIPTION OF PREFERRED EMBODIMENTS

Figure 1:
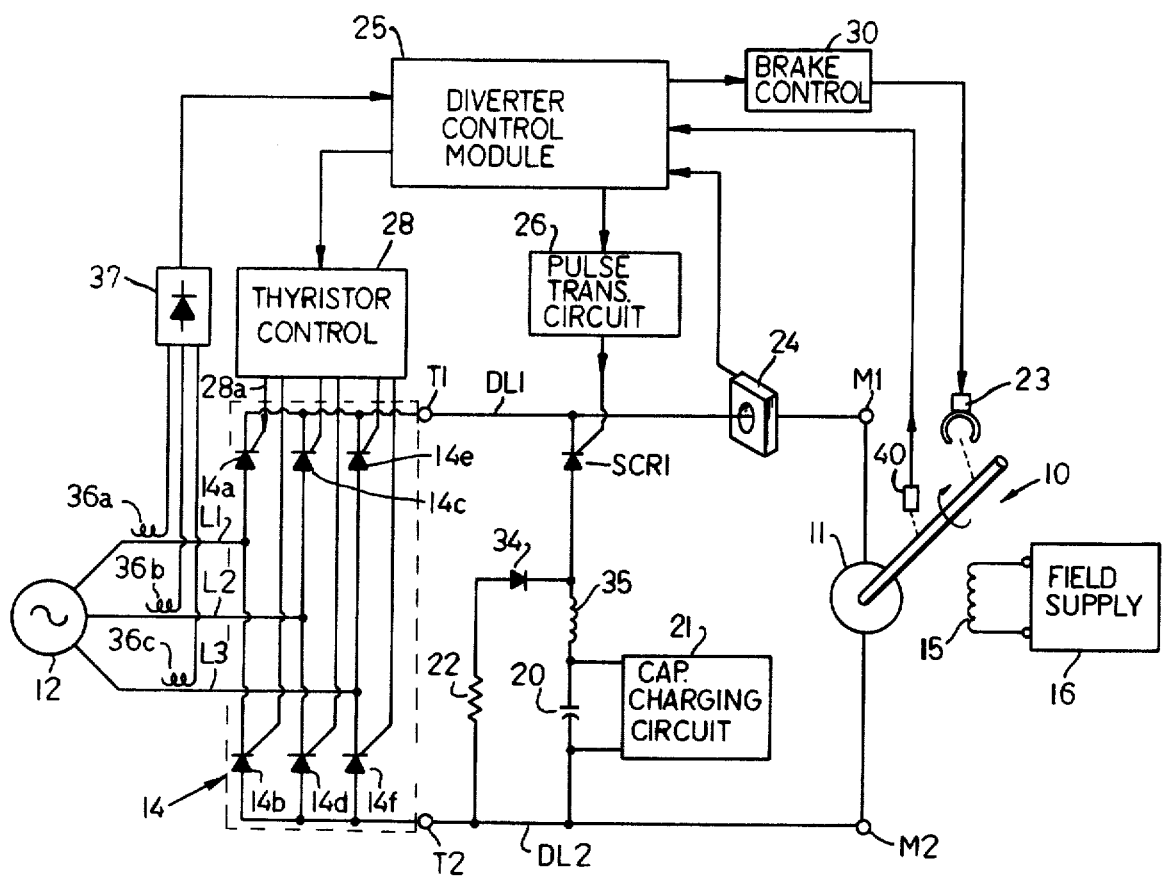
FIG. 1 is a schematic diagram of a first embodiment of a protective circuit in accordance with the invention shown in association with an a.c./d.c. thyristor converter and a d.c. motor armature.
Figure 2:
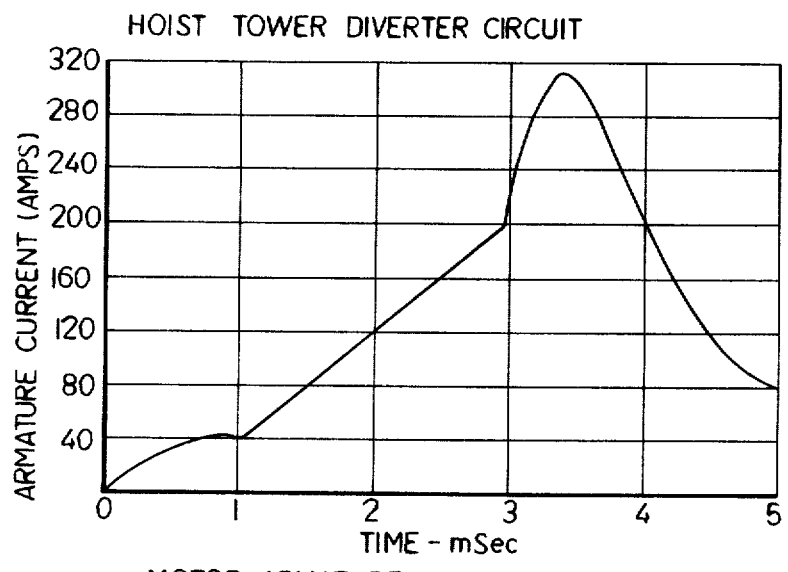
FIG. 2 is a graph depicting motor armature current plotted against time during operation of the protective circuit of FIG. 1.
Figure 3:
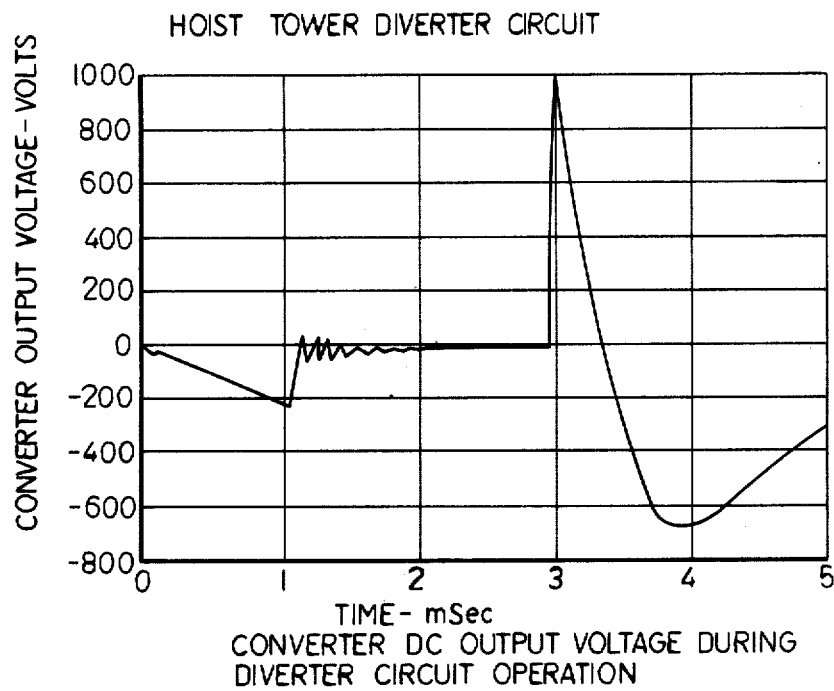
FIG. 3 is a graph depicting converter d.c. output voltage plotted against time during operation of the protective circuit of FIG. 1.
Figure 4:
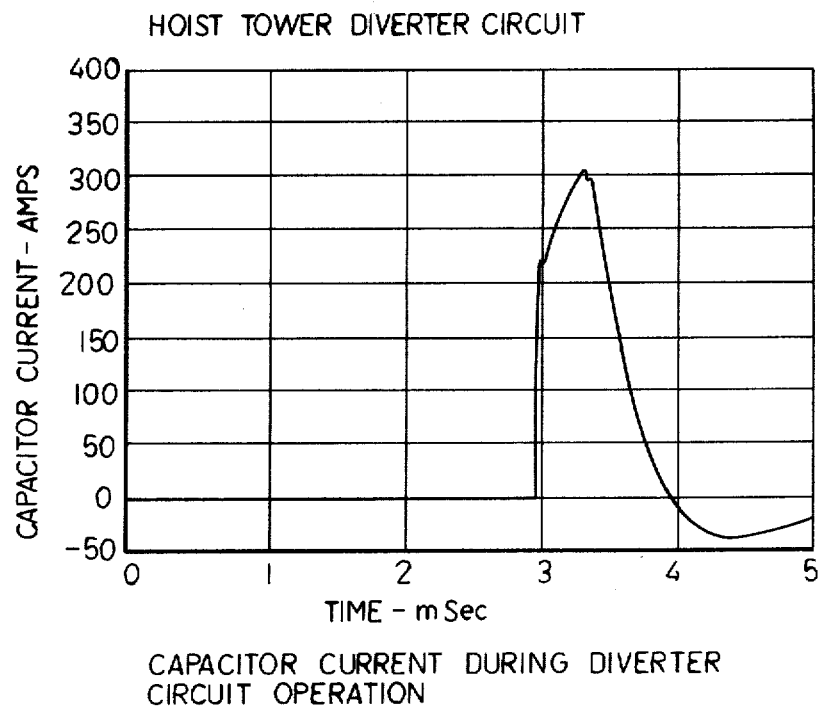
FIG. 4 is a graph depicting capacitor current plotted against time during operation of the protective circuit of FIG. 1.
Figure 5:
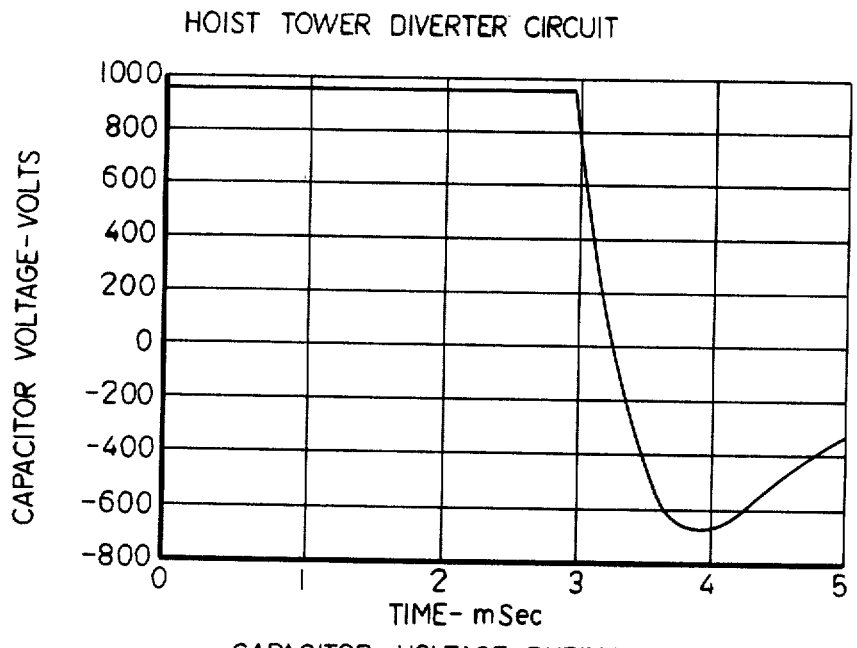
FIG. 5 is a graph depicting capacitor voltage plotted against time during operation of the protective circuit of FIG. 1.
Figure 6:
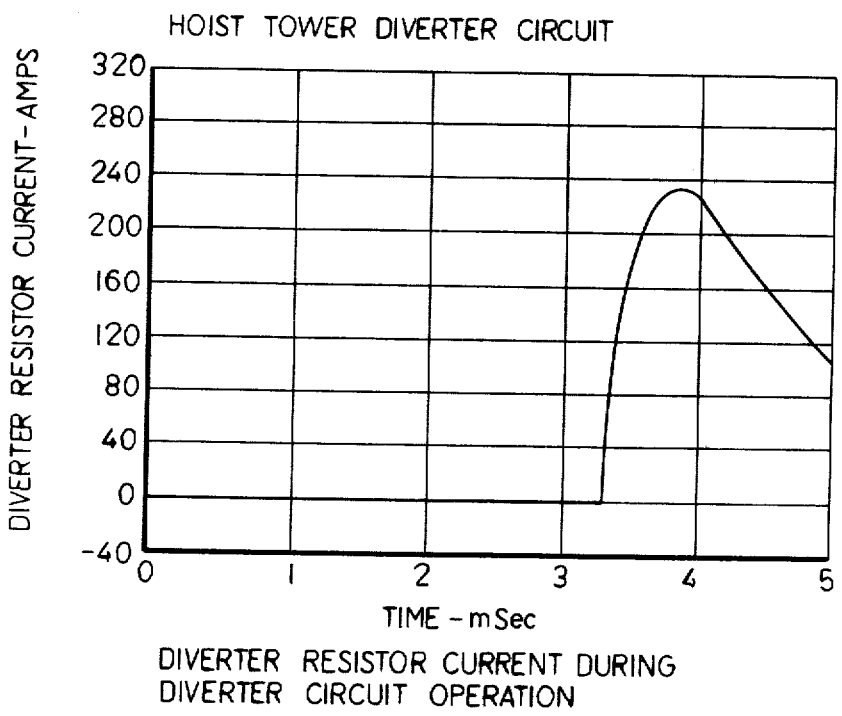
FIG. 6 is a graph depicting resistor current plotted against time during operation of the protective circuit of FIG. 1.

Referring to FIG. 1, the numeral 10 designates a d.c. motor whose armature 11 is supplied from an a.c. power source 12 having phase lines L1, L2, L3 through a thyristor-type a.c./d.c. converter 14. Motor field 15 is connected to a field supply source 16. Armature 11 is understood to be subject to damaging commutator flashover and is provided with a first embodiment of a protective circuit in accordance with the invention.

The protective circuit includes a normally charged capacitor 20, means 21 for charging the capacitor, and a diverter resistor 22. Capacitor 20 and resistor 22 are connectable in parallel across the converter 14 and armature 11 by a control thyristor in the form of an SCR1 in response to a fault condition, such as either predetermined high output current from converter 14 (i.e., indicative of high armature current) detected by a current sensing unit 24 or excessive a.c. input current to the converter 14 indicative of a system fault of some kind. Current sensing unit 24 is monitored by a diverter control module 25 which, in turn, is connected to control a pulse generating circuit 26 which operates SCR1. Capacitor 20 discharges across the converter 14 instantaneously and forcibly, but only temporarily blocks current flow from the thryristors 14a-f of converter 14 to the armature 11. Connection of the diverter resistor 22 across the armature 11 absorbs energy generated thereby as it rotates, for example, under the influence of an overhauling load and reduces armature current to prevent flash-over while other controls, hereinafter described, responsive to the fault condition detected by the diverter control module 25 permanently stop gating the thyristors 14a-f of converter 14 and set an electromechanical brake 23 to stop armature rotation. The said other controls includes for example, a converter control or firing circuit 28 connected between a diverter control module 25 and converter 14. A brake control circuit 30 is connected between diverter control module 25 and brake 23.

In the embodiment shown in FIG. 1, converter 14 comprises a plurality of thyristors 14a-f and has a pair of d.c. output terminals T1 and T2. The d.c. load or motor 10 has a pair of input terminals M1 and M2. A pair of conductors DL1 and DL2 are each connected between one of converter output terminals T1 and T2 and one of the motor input terminals M1 and M2. The firing circuit 28 is provided for switching the converter thyristors 14a-f on and off in a predetermined sequence to energize the motor 10 and is further operative in proper circumstances to switch all of the thyristors 14a-f off to shut-down the converter 14. The protective circuit operates to quickly interrupt energization of the armature 11 from converter 14 when a fault condition is detected and to provide a diverse path for the current from armature 11, and to then shut down the entire system. The protective circuit comprises the aforementioned capacitor 20; means 21 for charging the capacitor; the aforesaid diverter resistor 22; control thyristor means in the form of an SCR1 operative to connect the charged capacitor 20 across the converter output terminals T1 and T2 to block the output of the converter 14 and to connect the resistor 22 across the motor armature input terminals M1 and M2; and means including the current sensing unit 24, control module 25 and pulse transformer circuit 26 responsive to a fault condition indicative of excessive current flow between said converter 14 and the motor armature 11 to effect subsequent operation of the control thyristor SCR1 (thereby connecting the charged capacitor 20 and the resistor 22) and to effect operation of the converter control means 28 to shut down the converter 14 and to operate the brake circuit 30 for brake 23 to stop rotation of motor armature 11.

In the embodiment of FIG. 1, capacitor 20 and resistor 22 each have one side connected to one conductor DL2, and control thyristor SCR1 is connected between the other conductor DL1 and the other sides of capacitor 20 and resistor 22. A diode 34, polarized as shown, is connected between the said other sides of resistor 22 and the positive side of capacitor 20 to prevent the capacitor from discharging through resistor 22. An inductance 35 is connected in series circuit with capacitor 20 and SCR1 to control the rate of discharge thereof. The means responsive to the fault conditions includes current sensing unit 24 for sensing current flow in at least one of the conductors DL1 and DL2 and further includes means, such current sensing devices 36a, b, c and diode circuit 37, for sensing a fault condition on the a.c. input side of converter 14. Current sensing unit 24 may, for example, take the form of a gapped toroidal core coupled to a Hall-effect generator which provides an output indicative of current flow magnitude and direction.

When employed in a single bridge drive system shown in FIG. 1, capacitor 20 is normally charged up to some predetermined d.c. voltage whenever the system is in operation by charging circuit 21. The capacitor voltage must be substantially larger than the peak output voltage of converter 14 in order to be capable of commutating off (blocking) the bridge SCR's 14a-f, as hereinafter explained in detail.

The output current of converter 14 or armature current of motor armature 11 is continuously monitored by current sensing unit 24. The output signal of unit 24 goes into diverter control module 25 where the current signal is compared to an adjustable level reference signal. If some fault condition occurs which causes the d.c. current in line DL1 to increase until it exceeds normal or predetermined operating levels, the protective control system initiates a shut-down sequence. When a shut-down is required, the diverter control module 25 immediately does three things: it operates firing circuit 28 to remove all gating signals to converter 14; it operates pulse transformer circuit 26 so as to give a gating signal to control SCR1; and it starts the normal system shut-down sequence, including operation of brake control circuit 30 at its brake 23.

The gating pulses to the converter bridge SCR's 14a-f must be removed immediately so that the converter SCR's 14a-f can be blocked by the action of capacitor 20 of protective circuit. This not only means that there must be no new gating pulses but also that any gating pulses present at the time of the fault be terminated as soon as possible. The force commutation action of capacitor 20 is only able to effect a reverse bias voltage on the converter SCR's 14a-f for a period of several hundred microseconds, after which, if a gating signal is still present for the SCR's 14a-f, the devices 14a-f would resume conduction and the fault persist.

At the same time as the gating signals to converter 14 are being turned off, control thyristor SCR1 is gated. The turn-on of SCR1, in effect, applies the high voltage of charged-up capacitor 20 across the d.c. bus lines DL1 and DL2. Since capacitor 20 voltage is substantially higher than the maximum possible converter 14 output voltage, converter 14 becomes reverse biased and ceases to conduct. The capacitor 20 now takes over from the bridge circuit 14 as a current path and begins to discharge and the voltage across it drops quickly. Within a few hundred microseconds, the SCR's in converter 14 that were conducting are no longer reverse biased and will have regained their forward blocking capability.

As capacitor 20 continues to discharge, the voltage across it reverses and it starts to charge up to an opposite polarity. At this time the motor current from armature 11 can now flow through diverter resistor 22 and continues to do so until motor armature 11, acting as a generator, is brought to a stop. The resistor 22 is sized not so much to bring about dynamic braking of armature 11, but merely to provide a current path until the mechanical brake 23 brings motor rotation to a halt. Of course, diverter resistor 22 assists in braking and is sized to restrict motor speeds to less than base speed under full load conditions. The actual voltage and current waveforms which occur during operation of the protective circuit shown in FIG. 1 are shown in FIGS. 2 through 7 and are hereinafter referred to.

Finally, as part of the protective circuit operation, the normal system shut-down procedure is begun. A relay (not shown) in the diverter control module 25 is energized when a fault is detected which causes the appropriate control relay action to shut-down the system. This action includes operation of brake control circuit 30 and setting the brake 23 when the protective circuit trips. The protective circuit can reduce fault level currents in the system back down to more normal levels but will not bring the motor rotation motion to a stop by itself because the components would not normally be sized to handle dynamic braking currents for an extended period of time.

Figure 8:
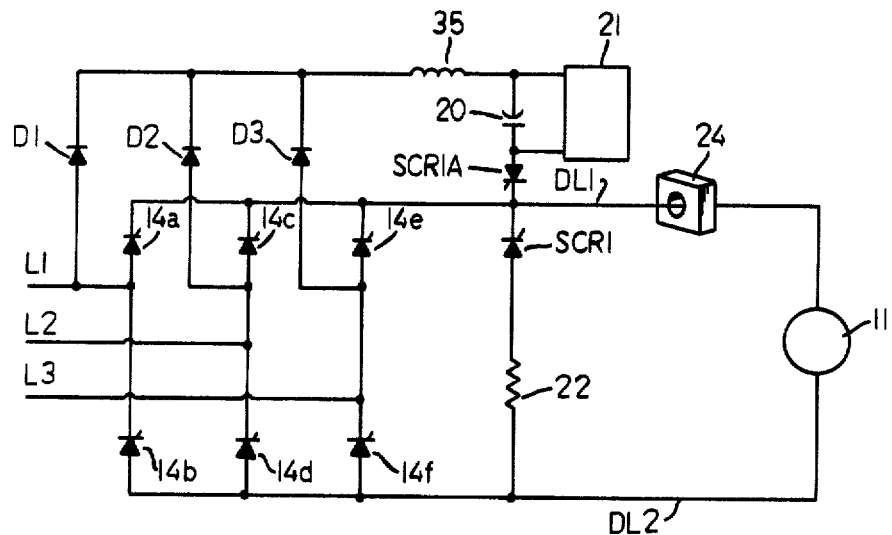
FIG. 8 is a schematic diagram of a second embodiment of a protective circuit.

FIG. 8 shows a second embodiment of a protective circuit in accordance with the present invention. The circuit of FIG. 8 functions in a manner similar to that described above in connection with FIG. 1 except that this circuit will only force commutate off (i.e., block conduction) of the conducting SCR (or SCR's) 14a-f connected to the positive bus DL1, rather than all conducting SCR's in the bridge. This system has the capability of turning off the SCR devices no matter what the magnitude or polarity of the incoming a.c. line voltage is. However, this assumes that an SCR 14a-f is actually capable of being turned off and is not shorted or faulty in some other manner.

The protective circuit of FIG. 1 is simpler than that of FIG. 8 in that three diodes D1, D2, D3 of FIG. 8 are eliminated and the force commutation circuitry is connected to the negative bus DL2 of the bridge 14 instead of DL1. The system of FIG. 8 is similar in appearance and operation to that of FIG. 1. With the system of FIG. 8, firing circuit 28 will turn off all the conducting SCR's 14a-f in the converter bridge 14. Should one SCR 14a-f have failed, the converter 14 will still remain off. In FIG. 8, the length of time that the SCR's 14a-f are actually reverse biased is very much dependent upon the magnitude and polarity of the a.c. line voltage at L1, L2, L3 because the reverse bias voltage is equal to the instantaneous capacitor 20 voltage minus the instantaneous a.c. line voltage.

Comparing FIGS. 1 and 8 it is seen that the diverting thyristor SCR 1A in the protective circuit of FIG. 8 is replaced with a diode 34 in FIG. 1 and reconnected to the anode of the SCR1 instead of the positive bus DL1.

Figure 9:
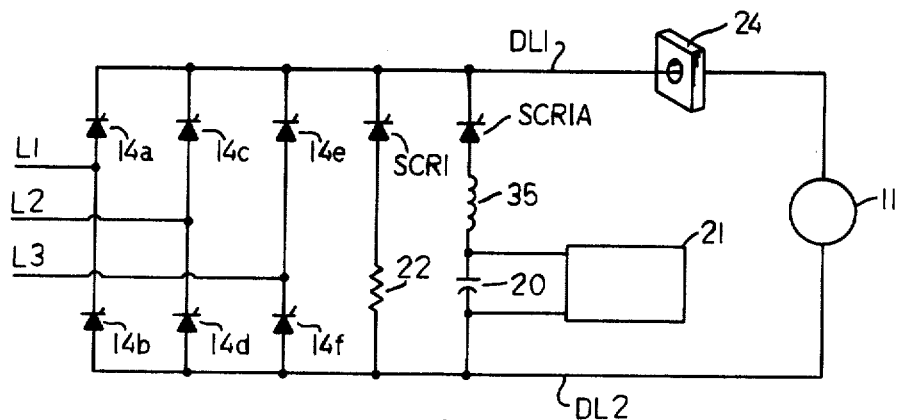
FIG. 9 is a schematic diagram of a third embodiment of a protective circuit.

FIG. 9 shows a third embodiment of a protective circuit in accordance with the present invention wherein diverter resistor 22 and capacitor 20 are individually controlled by control thyristor SCR1 and SCR1A, respectively, and individually connectable therethrough across the bus lines DL1 and DL2. However, circuit operation is similar to that described in connection with FIGS. 1 and 8.

Referring now to the waveforms of FIGS. 2, 3, 4, 5 and 6, a fault condition for the system of FIG. 1 was tested and is depicted through computer simulation. The fault was produced at time t=1.0 milliseconds by "shorting" the converter 14. After the fault occurs, the motor current rises nearly linearly (see FIG. 2) until it reaches the trip setting of the protective circuit which, for example, is selected as 200 amperes. The protective circuit then goes into operation and the different waveforms of FIGS. 3, 4, 5 and 6 show the results as the motor 10 current is forced back down to safe levels after a short initial peak of current.

By making a computer analysis, expected results for any given system application can be analysed and it is possible to determine whether a specific protective circuit will function acceptably under various operating conditions. It is then possible to size the system components more accurately for the chosen application, since it is then known what voltages and currents can be expected.

Figure 7:
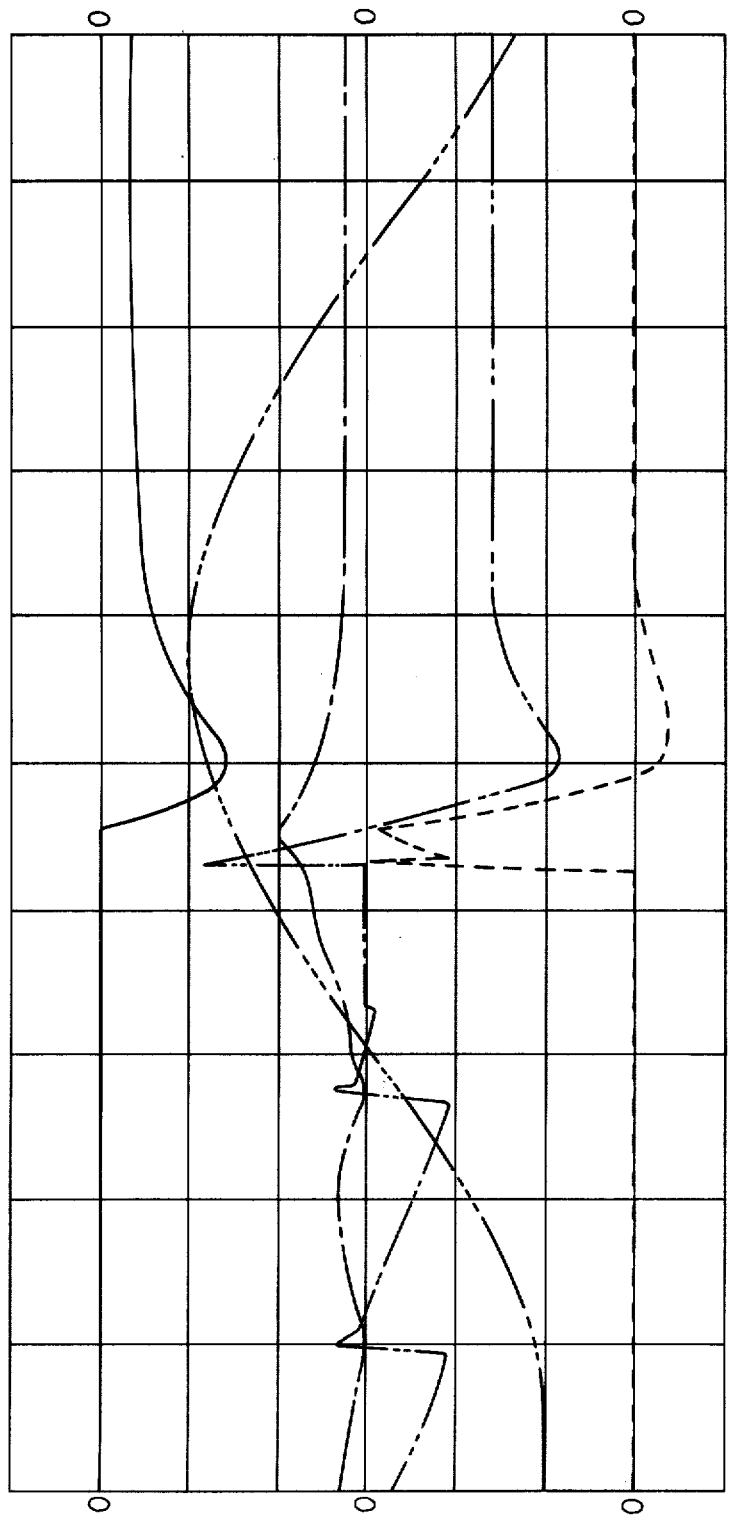
FIG. 7 is a graph wherein the curves depicted in FIGS. 2, 3, 4, 5 and 6 are overlaid and combined.

An actual system test on a hoist test tower powered by a motor rated at 100 horsepower was performed. In FIG. 7, the resultant waveforms for the type of protective circuit of FIG. 1 are shown.

If an SCR 14a-f in FIG. 1 is mis-triggered while the drive system is operating, it will cause the protective circuit to trip. This causes the converter bridge 14 to be shorted which is indicated on the waveforms by the d.c. bridge voltage going to zero (see FIG. 3). The armature current then starts to increase in a early linear manner after the short occurs until the protective circuit trips (see FIG. 2). When the protective SCR1 is gated, the charged up capacitor 20 is added into the armature circuit and acts like an additional voltage source causing the current to increase even faster (see FIG. 2). This effect lasts only a short time as the capacitor 20 quickly discharges and the motor current comes back to a lower level (see FIG. 2). When the capacitor 20 begins to charge up in the opposite direction current will also start flowing through the diverter resistor 22 and will continue until the motor 10 stops.

The diverter control module 25 and current sensor 24 together monitor the converter 14 d.c. current and determines just when the system should be shut down due to an over-current situation. During a fault, the diverter control module 25 then causes the proper protective circuit action to take place as described previously.

It is to be understood that diverter control module 25 contains a power supply (not shown) which provides the regulated voltage d.c. power for the operation and control of itself and for the current sensor 24.

Figure 11:
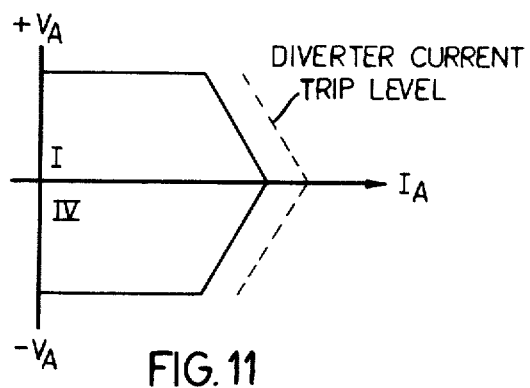
FIG. 11 is a diagram depicting diverter current trip level in graphic form.

The only other input signal to diverter control module 25 besides the current signal from current sensing unit 24 and from the a.c. lines L1, L2, L3 through module 37 is an armature voltage feedback signal from voltage sensor device 40. This is to take advantage of the V-I motor control characteristics as are typically found on the hoist motion of the electric mining shovels and is depicted schematically in FIG. 11. If this input is not provided, the control module 25 will effect tripping at the same current level regardless of the armature voltage. All the inputs and outputs to diverter control module 25 and current sensor 24 are completely isolated either by reed relays or optical couplers (not shown) except for the armature voltage signal from device 40.

The diverter control module 25 in accordance with the invention can be used on reversing drives, provided it contains the necessary comparators (not shown) and references for detecting current faults in both directions. When a fault current is detected, the appropriate comparator (not shown) "trips" and remains tripped until the protective control is reset. The corresponding output coupler (not shown) is then turned on and eventually causes the protective circuit SCR1 to be gated. If a fault current is detected in either direction, then firing circuit 28 instantly removes all SCR gating signals to converter 14. At the same time, the drive system shutdown procedure is initiated.

As part of the protective control system, but preferably separate from the diverter control module 25, is the pulse transformer or firing circuit 26 which actually gates the SCR1 when a signal is received from the diverter control 25. The diverter control module 25 will turn on the SCR gating coupler (not shown) in the module 25 when a fault occurs to initiate a signal in the pulse transformer circuit 26 lasting for a period of about 10 milliseconds which is then transistor-amplified and fed to a pulse transformer which is connected to SCR1.

Selection of capacitor 20 and the voltage to which it is charged affect the operation of the protective circuits probably more than any other factor. During about the first millisecond when the protective system is in operation but after the SCR's 14$a$-$f$ have been successfully turned off, the capacitor circuit can be simplified to that shown in FIG. 10 for purposes of analysis. The diverter resistor 22 is not shown in FIG. 10 since the analysis is being done for the time period before the resistor conducts any current. It is now possible to calculate the approximate reverse recovery time for the commutated SCR's 14$a$-$f$ of FIG. 1, for example, and the peak motor current that will result during circuit operation for a given set of conditions.

For reliable protective circuit operation, capacitor 20 must be capable of maintaining a reverse bias voltage across the commutated SCR's for a minimum period of time—generally in the order of several hundred microseconds. The selected capacitor and charging voltage must be at least large enough to insure this minimum time. However, these factors must not be made too large or the resulting peak in the motor current which results after the protective circuit goes into operation may cause the motor of flash anyway. Besides, it is more economical to keep the capacitor size to a minimum and the charging voltage lower to keep the voltage ratings of the semi-conductors down.

Figure 10:
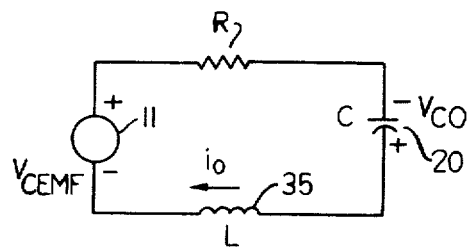
FIG. 10 is a simplified circuit diagram of a capacitor circuit in accordance with the invention.

The Laplace expression for the simplified circuit shown in FIG. 10 is:

$$\frac{V}{s} = I\left(\frac{1}{Cs} + Ls + R\right) - \frac{V_{Co}}{s} - Li_o$$

where,

V is CEMF motor voltage at time of fault,
C is protective circuit capacitance,
L is motor armature inductance plus di/dt reactor inductance,
R is motor armature resistance plus all other resistance in loop,
$V_{Co}$ is initial voltage across capacitor,
$i_o$ is initial armature current at time of fault.

After manipulating and converting to the time domain, the current in the circuit as a function of time becomes:

$$i(t) = i_p e^{-\frac{Rt}{2L}} \sin(\omega t + \phi)$$

where, $$i_p = i_o \frac{\sqrt{\left(\frac{V + v_{co}}{Li_o} - \frac{R}{2L}\right)^2 + \omega^2}}{\omega}$$

$$\omega = \sqrt{\frac{4}{LC} - \left(\frac{R}{L}\right)^2}$$

$$\phi = \tan^{-1} \frac{\omega}{\left(\frac{V + v_{co}}{Li_o} - \frac{R}{2L}\right)}$$

From the current equation as a function of time, it is possible to determine the peak d.c. armature current after the protective circuit goes into operation. By its very nature, the protective circuit will actually force the fault current to go even higher for a very short time than what it would have otherwise because of the high voltage source which the charged capacitor 20 represents. The voltage across capacitor 20 drops very quickly however and the d.c. current comes down accordingly. The peak current that the system of FIG. 10 will see during a fault is approximately equal to $i_p$. This neglects the effect of the exponential function in the current expression since the time t is quite small when the peak occurs and so:

$$e^{-\frac{Rt}{2L}} \approx 1$$

To calculate the reverse recovery time that is available for a given set of conditions, the capacitor voltage as a function of time must be known. From the simplified circuit above, the capacitor voltage is:

$$v_c(t) = L\frac{di(t)}{dt} + Ri(t) - V_{CEMF}$$

After substituting the current expression in the above equation and simplifying, the capacitor voltage expression becomes:

$$v_c(t) = L I_p \left( \frac{R}{2L} \sin(\omega t + \phi) + \omega \cos(\omega t + \phi) \right) - V_{CEMF}$$

The reverse recovery time is that period of time when the capacitor voltage is greater than or equal to the instantaneous line voltage ($V$AC) between the two force commutated SCR's. To determine the time, the capacitor voltage expression should be solved with $v_c(t)$ set equal to the line voltage at the time of the fault. This neglects the L·(di/dt) and iR drops across the di/dt reactor since they are small.

If the fault condition occurs while the converter 14 is regenerating, the instantaneous line voltage with the polarity as defined in the simplified schematic in FIG. 10 would be negative. The analysis for this circuit is only valid while $v_c(t)$ is greater than or equal to zero, otherwise the diverting resistor must be accounted for in the circuit. To calculate a worst case reverse recovery time for regenerating conditions, set $v_c(t)=0$. This is what has been done to determine the minimum capacitor size and charging voltage for a system. It is not practical or worthwhile to make the circuit capable of maintaining the reverse recovery time for a peak positive a.c. line voltage condition.

The reactor 35 in series with the energy storage capacitor 20 limits the di/dt of the capacitor discharge current through the protective SCR (SCR1 in FIG. 1) when it first turns on. It should be sized so that the di/dt is just less than the maximum non-repetitive rating of the device according to:

$$\frac{di}{dt} \max = \frac{V_{co}}{L}$$

The selection of the diverting resistor 22 is determined solely by the particular application. Normally, the resistance is sized to provide 1.0 P.U. dynamic braking, i.e.:

$$R = \frac{\text{rated armature voltage}}{\text{rated armature current}}$$

The power dissipation rating of resistor 22 needs to be sufficient only to dissipate the energy dumped into the resistor until the brake 23 can stop the motor armature 11 from rotating and generating power. The maximum number of operations within a given period of time must be considered when sizing the power dissipation rating of resistor 22. Similarly, the power semi-conductors used in the system need to be carefully selected to be able to handle the current pulses for as many times as specified by system requirements.

I claim:

1. Protective apparatus for use with an a.c./d.c. converter comprising thyristors and having output terminals which are connected by conductor means to the input terminals of the armature of a d.c. motor driven by said converter, said conductor means including a pair of conductors between said converter and said motor armature, said converter being controlled by firing circuit means connected to the gating terminals of said thyristors and operative to switch said thyristors on and off in a predetermined sequence to energize said armature and further operative to switch said thyristors off to shut down said converter and thereby turn off said motor, said protective apparatus comprising:

capacitor means;

means for charging said capacitor means to a voltage higher than that at said output terminals of said converter;

means to control the rate of discharge of said capacitor means;

resistor means;

said capacitor means and said resistor means each having one side connected to one of said conductors;

control thyristor means connected between the other sides of said capacitor means and said resistor means and the other of said conductors;

and control means, including means for sensing current flow in at least one of said conductors, responsive to a fault condition which causes increased current flow through said conductor means for providing a control signal for operating said control thyristor means to connect the charged capacitor means to said converter output terminals so as to block current flow from said converter to said armature, to connect said resistor means to said motor armature input terminals so as to divert current flow generated by said armature through said resistor means, and to operate said firing circuit means to shut off said converter, said control means including means connected between said resistor means and said capacitor means to prevent said capacitor means from discharging through said resistor means, inductance means connected in series circuit with said capacitor means to control the rate of discharge thereof, means for sensing current flow on the a.c. side of said converter, and brake means operative to stop armature rotation and wherein said control signal is further operative to operate said brake means.

* * * * *